United States Patent
Yamamoto et al.

(10) Patent No.: US 10,201,876 B2
(45) Date of Patent: Feb. 12, 2019

(54) LASER WELDING METHOD, METHOD FOR MANUFACTURING WELDED BODY, METHOD FOR MANUFACTURING ELECTRODE FOR SPARK PLUG, AND METHOD FOR MANUFACTURING SPARK PLUG

(71) Applicant: NGK SPARK PLUG CO., LTD., Nagoya-shi, Aichi (JP)

(72) Inventors: Hiroki Yamamoto, Iwakura (JP); Honami Ohara, Komaki (JP)

(73) Assignee: NGK SPARK PLUG CO., LTD., Nagoya (JP)

( * ) Notice: Subject to any disclaimer, the term of this patent is extended or adjusted under 35 U.S.C. 154(b) by 212 days.

(21) Appl. No.: 15/451,543

(22) Filed: Mar. 7, 2017

(65) Prior Publication Data
US 2017/0259380 A1 Sep. 14, 2017

(30) Foreign Application Priority Data

Mar. 9, 2016 (JP) .................... 2016-045605
Feb. 1, 2017 (JP) .................... 2017-016899

(51) Int. Cl.
*A61K 31/5383* (2006.01)
*B23K 26/21* (2014.01)
(Continued)

(52) U.S. Cl.
CPC ............ *B23K 26/21* (2015.10); *B23K 26/082* (2015.10); *B23K 26/0869* (2013.01);
(Continued)

(58) Field of Classification Search
CPC .... B23K 26/21; B23K 26/60; B23K 26/0869; B23K 26/26; B23K 26/242; B23K 26/082;
(Continued)

(56) References Cited

U.S. PATENT DOCUMENTS

| 4,281,235 A | * | 7/1981 | Peloquin | ................. B23K 1/19 219/121.14 |
| 5,001,323 A | * | 3/1991 | Matsutani | ........ A61B 17/06004 219/121.63 |

(Continued)

FOREIGN PATENT DOCUMENTS

| CN | 104668776 A | 6/2015 |
| JP | H08-257775 A | 10/1996 |

(Continued)

OTHER PUBLICATIONS

European Patent Office, Extended European Search Report issued in corresponding Application No. 17159529.1, dated Jul. 25, 2017.

*Primary Examiner* — Eric Stapleton
(74) *Attorney, Agent, or Firm* — Stites & Harbison, PLLC; Jeffrey A. Haeberlin (57) ABSTRACT

Irradiation with a laser beam is started at a welding start position of two members that are stacked together, and the output of the laser beam is set so that spatter is not generated. After the start of the irradiation, the output of the laser beam is gradually increased so that a penetration depth from an irradiated edge to a deeper location between abutting surfaces of the two members falls within a predetermined penetration depth range while the laser beam is not moved. After the output of the laser beam is gradually increased, the laser beam is moved toward a welding end position so that the penetration depth is maintained within the penetration depth range.

16 Claims, 7 Drawing Sheets

(51) Int. Cl.
  *B23K 26/60* (2014.01)
  *H01T 13/39* (2006.01)
  *H01T 21/02* (2006.01)
  *B23K 26/08* (2014.01)
  *B23K 26/26* (2014.01)
  *B23K 26/323* (2014.01)
  *B23K 26/242* (2014.01)
  *B23K 26/082* (2014.01)
  *B23K 26/244* (2014.01)
  *B23K 101/00* (2006.01)
  *B23K 101/36* (2006.01)
  *B23K 103/18* (2006.01)

(52) U.S. Cl.
  CPC .......... *B23K 26/242* (2015.10); *B23K 26/244* (2015.10); *B23K 26/26* (2013.01); *B23K 26/323* (2015.10); *B23K 26/60* (2015.10); *H01T 13/39* (2013.01); *H01T 21/02* (2013.01); *B23K 2101/006* (2018.08); *B23K 2101/36* (2018.08); *B23K 2103/18* (2018.08); *B23K 2103/26* (2018.08)

(58) Field of Classification Search
  CPC ............... B23K 26/244; B23K 26/323; B23K 2103/18; B23K 2101/006; B23K 2103/26; B23K 2101/36; H01T 13/39; H01T 21/02; A61B 17/06004; A61B 17/06066
  USPC ............ 219/121.63, 121.64, 121.77, 121.82, 219/121.84
  See application file for complete search history.

(56) References Cited

U.S. PATENT DOCUMENTS

| | | | | |
|---|---|---|---|---|
| 5,151,608 A * | 9/1992 | Torii | B23K 9/0956 | 250/201.6 |
| 5,306,890 A * | 4/1994 | Minamida | B21D 47/00 | 219/121.64 |
| 5,371,337 A * | 12/1994 | Campbell | B23K 26/18 | 219/121.63 |
| 5,380,978 A * | 1/1995 | Pryor | B23K 26/032 | 219/121.64 |
| 5,408,065 A * | 4/1995 | Campbell | B23K 26/0884 | 219/121.6 |
| 5,502,292 A * | 3/1996 | Pernicka | B23K 26/24 | 219/121.63 |
| 5,532,450 A * | 7/1996 | Iwai | B23K 26/0838 | 219/121.58 |
| 5,739,912 A * | 4/1998 | Ishii | G01B 11/24 | 219/124.34 |
| 6,034,347 A * | 3/2000 | Alber | B23K 15/0006 | 219/121.63 |
| 6,668,034 B2 * | 12/2003 | Mahe | G21C 17/06 | 219/121.64 |
| 6,818,857 B1 * | 11/2004 | Cho | B23K 26/0604 | 219/121.64 |
| 7,345,258 B2 * | 3/2008 | Yasuda | B23K 26/0661 | 219/121.63 |
| 7,510,620 B2 * | 3/2009 | Terada | B29C 65/1635 | 156/272.8 |
| 7,897,891 B2 * | 3/2011 | Chen | B23K 26/0604 | 219/121.63 |
| 8,105,712 B2 * | 1/2012 | Miyata | B23K 26/206 | 429/185 |
| 8,399,804 B2 * | 3/2013 | Hosokawa | B23K 26/147 | 219/137.42 |
| 9,053,858 B2 * | 6/2015 | Mori | H01G 9/008 | |
| 9,672,985 B2 * | 6/2017 | Mori | H01G 9/008 | |
| 2002/0027128 A1 * | 3/2002 | Cheng | G02F 1/136259 | 219/121.64 |
| 2004/0036975 A1 * | 2/2004 | Slatkine | A61B 18/20 | 359/584 |
| 2005/0011870 A1 * | 1/2005 | Bernhardt | B23K 26/32 | 219/121.64 |
| 2005/0218123 A1 * | 10/2005 | Hayakawa | B29C 65/1635 | 219/121.64 |
| 2005/0234527 A1 * | 10/2005 | Slatkine | A61B 18/203 | 607/89 |
| 2006/0231535 A1 * | 10/2006 | Fuesting | B23P 6/007 | 219/121.64 |
| 2006/0237129 A1 * | 10/2006 | Chen | B23K 26/0604 | 156/272.8 |
| 2007/0170158 A1 * | 7/2007 | Greig | B23K 26/034 | 219/121.64 |
| 2010/0078413 A1 * | 4/2010 | Hosokawa | B23K 26/147 | 219/121.64 |
| 2010/0116794 A1 * | 5/2010 | Taido | B23K 26/06 | 219/121.64 |
| 2010/0247992 A1 * | 9/2010 | Miyata | B23K 26/206 | 429/94 |
| 2011/0027645 A1 * | 2/2011 | Komatsuki | H01M 2/08 | 429/185 |
| 2011/0195288 A1 * | 8/2011 | Harima | H01M 10/0431 | 429/94 |
| 2012/0015578 A1 * | 1/2012 | Nakayama | H01T 13/38 | 445/7 |
| 2012/0094141 A1 * | 4/2012 | Kawamura | B23K 15/0093 | 428/601 |
| 2012/0121954 A1 * | 5/2012 | Harima | H01M 2/0413 | 429/94 |
| 2013/0068384 A1 * | 3/2013 | Liu | C03B 23/203 | 156/272.8 |
| 2013/0087540 A1 * | 4/2013 | Gu | B23K 26/32 | 219/121.64 |
| 2013/0155575 A1 * | 6/2013 | Mori | H01G 9/008 | 361/500 |
| 2013/0215185 A1 * | 8/2013 | Nystrom | B41J 2/161 | 347/20 |
| 2013/0250475 A1 * | 9/2013 | Mori | H01G 9/008 | 361/301.5 |
| 2014/0161618 A1 * | 6/2014 | Walker | B23K 15/0006 | 416/223 A |
| 2014/0175068 A1 * | 6/2014 | Poss | B23K 26/20 | 219/121.64 |
| 2014/0231021 A1 * | 8/2014 | Liu | C03B 23/203 | 156/380.9 |
| 2015/0283648 A1 * | 10/2015 | Hisada | B23K 26/22 | 403/272 |
| 2016/0031042 A1 * | 2/2016 | Gietzelt | B32B 15/017 | 403/271 |
| 2016/0067832 A1 * | 3/2016 | Kobayashi | B23K 26/03 | 219/121.83 |
| 2016/0136755 A1 * | 5/2016 | Kobayashi | B23K 26/1437 | 219/121.64 |

FOREIGN PATENT DOCUMENTS

JP    11-320146 A    11/1999
JP    2008-277272 A   11/2008

* cited by examiner

LASER WELDING METHOD, METHOD FOR MANUFACTURING WELDED BODY, METHOD FOR MANUFACTURING ELECTRODE FOR SPARK PLUG, AND METHOD FOR MANUFACTURING SPARK PLUG

CROSS REFERENCE TO RELATED APPLICATIONS

The present application claims priority to Japanese Patent Application Nos. 2016-045605 and 2017-016899, which were filed on Mar. 9, 2016 and Feb. 1, 2017, respectively, the disclosures of which are herein incorporated by reference in their entirety.

BACKGROUND OF THE INVENTION

1. Field of the Invention

The present invention relates to a laser welding method by which two members are stacked together (abutted against each other) and an edge of the abutting surfaces of the two members is irradiated with a laser beam, which is directed toward a deeper location between the abutting surfaces, so that the abutting surfaces of the two members are laser welded together at the desired penetration depth (depth of penetration). The present invention also relates to a method for manufacturing a welded body.

2. Description of the Related Art

Two members may be laser-welded together (hereinafter also referred to simply as welded together) by, for example, arranging one principal surface (flat surface) of one member (plate member) and one flat surface of the other member, which may be a rectangular parallelepiped, so that the surfaces abut against each other and welding the abutting surfaces (opposing surface) together. In this case, one of the sides among the edges (outer edges) of the abutting surfaces (hereinafter referred to simply as one side) is irradiated with a laser beam directed toward a deeper location between the abutting surfaces. The one side, which serves as a welding line, is scanned with the laser beam at a constant velocity, so that the abutting surfaces of the two members (base materials) are joined together. This process is carried out to manufacture, for example, a ground electrode included in a spark plug of an automobile engine (see Patent Document 1). To increase the welding strength (joining strength) while ensuring sufficient precision in the welding process, the abutting surfaces need to be melted and solidified over as large an area as possible within a range in which excessive melting does not occur. For this purpose, parameters such as the output and scanning velocity (irradiation time) of the laser beam need to be set so that the metals are melted to a necessary and sufficient depth of penetration (melting depth in the irradiation direction) along the abutting surfaces from the one side among the edges of the abutting surfaces, the one side being a light-receiving portion irradiated with the laser beam (incident side), toward the opposite side at a deeper location in the irradiation direction (side toward which the laser beam is directed).

Figure 6A:
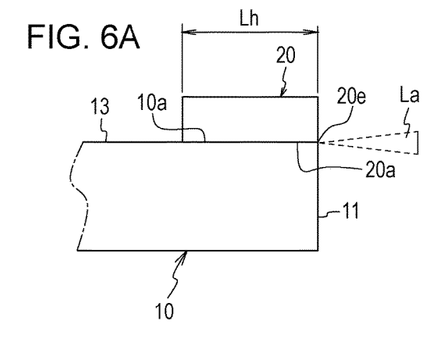
FIG. 6A is a front view.
Figure 6B:
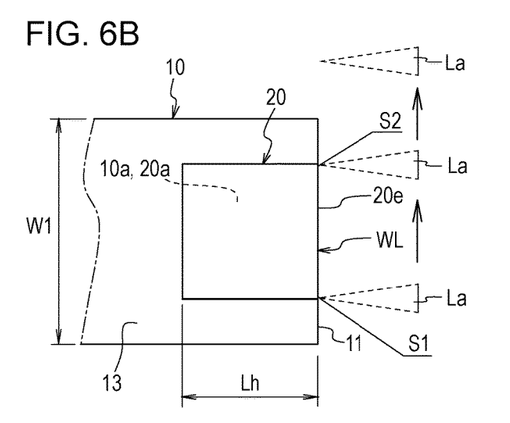
FIG. 6B is a plan view of FIG. 6A.
Figure 6C:
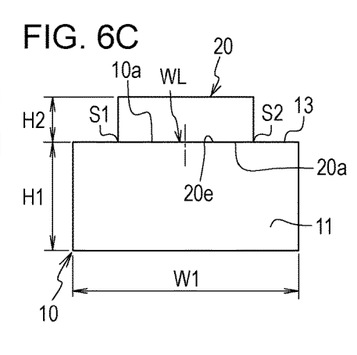
FIG. 6C is a side view viewed from the right in FIG. 6A (view of the ground electrode body from the front end surface)
Figure 8:
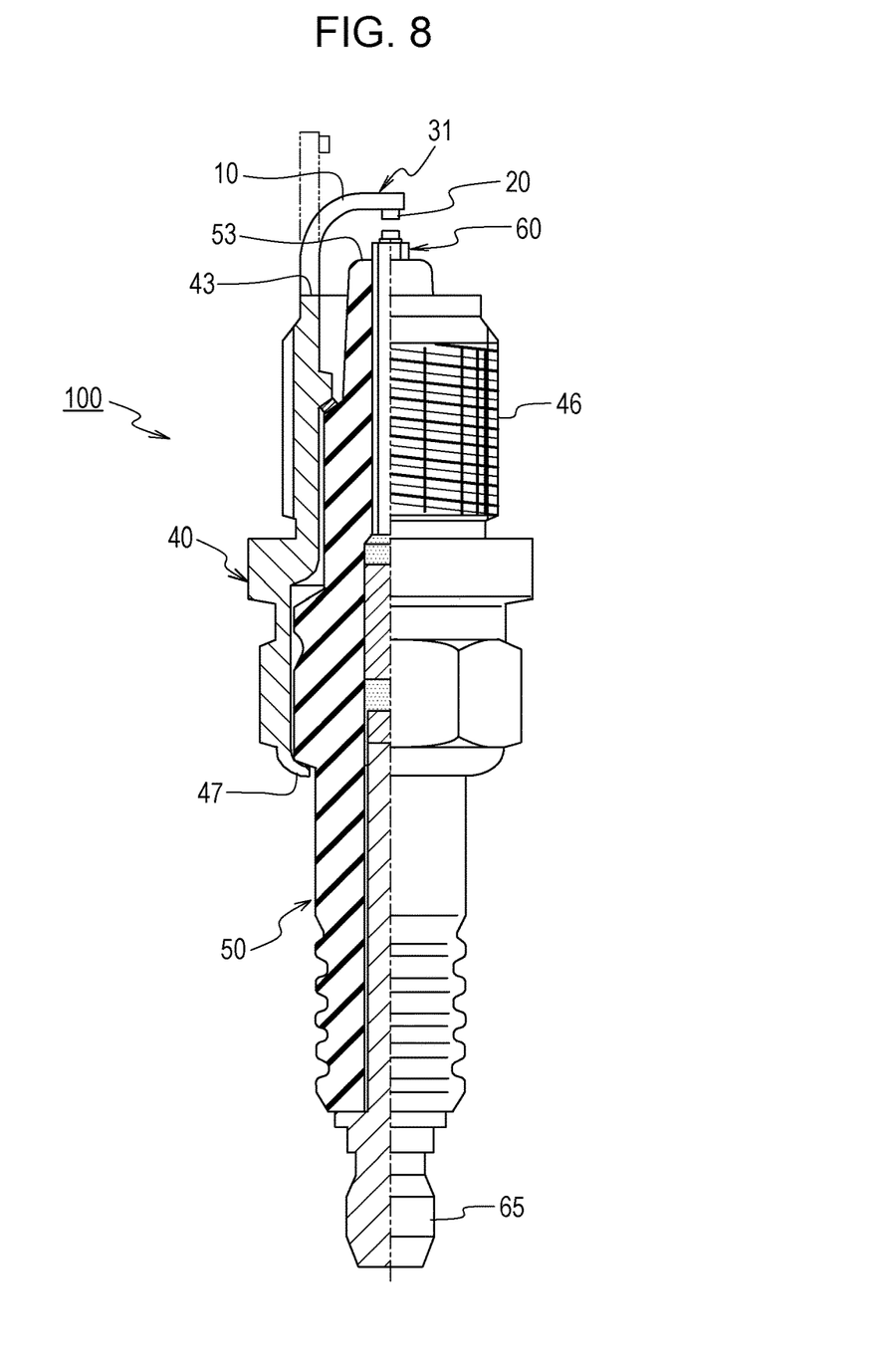
FIG. 8 is a longitudinal half-sectional view of an example of a spark plug according to the related art.

FIGS. 6A to 6C are enlarged views illustrating an example of such a welding process. More specifically, FIGS. 6A to 6C are enlarged schematic views illustrating the process of welding a noble metal tip 20 onto a front portion of a ground electrode body 10 (only a portion thereof is illustrated) in the process of manufacturing a ground electrode (component) 31 included in a spark plug 100 illustrated in FIG. 8. FIG. 8 is a longitudinal half-sectional view of the spark plug 100 according to the related art. The spark plug 100 includes a metal shell 40 having a tubular shape including portions of different diameters; an insulator 50 having a hollow cylindrical shape that extends through the metal shell 40; a center electrode 60 that is disposed in the central axial hole in the insulator 50 and that has a tip exposed at a front end (top end in FIG. 8) 53 of the insulator 50; and a ground electrode 31 that is securely welded to a front end surface 43 of the metal shell 40 and includes a ground electrode body 10 that is bent. The noble metal tip 20, which is securely welded to a front end of the ground electrode body 10, and the tip of the center electrode 60 define a spark discharge gap. The noble metal tip 20 is provided to improve the discharge ignitability between the ground electrode 31 and the tip end of the center electrode 60, which is a counter electrode in the spark plug 100, and to increase durability. In this specification, the ground electrode and the center electrode may also be referred to simply as electrodes, and the ground electrode body and the center electrode body may also be referred to simply as electrode bodies.

Referring to FIGS. 6A to 6C, the noble metal tip 20 is welded onto the front portion of the ground electrode body 10 by the following process. First, the noble metal tip 20 (a small rectangular parallelepiped made of a noble metal, such as platinum or iridium, or an alloy having a noble metal as a main component) is placed on a plate surface (flat surface) 13 of the ground electrode body 10 (for example, a strip-shaped rectangular bar member made of a nickel alloy) in a region near a front end surface 11 of the ground electrode body 10. As illustrated in FIG. 6A (front view) and FIG. 6B (plan view), the noble metal tip 20 is positioned so as to be aligned with (or be in the vicinity of) the front end surface 11 of the electrode body 10. Then, among the edges of abutting surfaces 10a and 20a of the two members 10 and 20 (members to be welded together), a right edge 20e (edge of the noble metal tip) in FIG. 6B (plan view), that is, a side (welding line WL) at the front end surface 11 of the ground electrode body 10, for example, is irradiated with a laser beam La and scanned from one end S1 toward the other end S2 at a constant velocity. Thus, the abutting surfaces 10a and 20a of the two members are welded together. The ground electrode body 10 is a small rectangular bar member (thin strip-shaped member) having a width W1 of about 2 to 3 mm and a thickness H1 of about 1 to 1.5 mm in cross section. The noble metal tip (hereinafter also referred to as a tip) 20 welded to the ground electrode body 10 is a small rectangular parallelepiped having a thickness H2 of about 0.4 to 1 mm and a flat surface (see FIG. 6B) with a length and a width of about 1 to 1.5 mm. Therefore, the welding line WL is as short as about 1 to 1.5 mm. In the welding process, as described above, the welding line WL is scanned with the laser beam La once at a constant velocity from one end (welding start position) S1 to the other end (welding end position) S2, that is, for example, from the bottom end to the top end in FIG. 6B.

To achieve the desired high welding strength without reducing the precision in the above-described welding process, as described above, the penetration depth needs to be sufficient relative to the side length Lh of the noble metal tip 20 in the irradiation direction of the laser beam (direction from right to left in FIGS. 6A and 6B) without causing excessive melting of the metals along the abutting surfaces 10a and 20a, that is, in the area of the flat surface of the noble metal tip 20 in the plan view of FIG. 6B. The penetration depth also needs to be prevented from greatly varying along the side (welding line WL) from the start position at one end S1 of irradiation (hereinafter referred also as a start position) to the end position at the other end S2 in the scanning direction of the laser beam La. Thus, the penetration depth is required to be within a penetration depth range (side length Lh±α) around the side length Lh with a small error α so that the penetration depth is sufficient relative to the side length Lh of the noble metal tip 20 and does not greatly vary along the welding line WL. This is because the ground electrode of the spark plug is subjected to severe conditions and required to have high ignitability and durability, and the abutting surfaces 10*a* and 20*a* thereof are required to be reliably welded over the entireties (entire areas) thereof without reducing the precision. Accordingly, the output, scanning velocity, etc., of the laser beam with which a necessary and sufficient penetration depth can be obtained have conventionally been determined based on test welding, and laser-beam scanning has been performed at a constant output and a constant velocity in the welding process. The laser-beam scanning can be performed not only by moving the laser beam but also by moving the members to be welded together (base materials) or by moving both the laser beam and the base materials relative to each other. These cases are also included in the laser-beam scanning described in this specification.

In the laser welding process, the irradiation laser beam has conventionally been set to a high constant output. The reason for this is as follows. In the state after the irradiation with the laser beam and melting of the base materials to be welded together (the two members, which are the ground electrode body and the noble metal tip in FIGS. 6A to 6C) have been started, the base materials have already been heated in a region around the scanned location. However, when the irradiation with the laser beam is started (when welding is started) at the start position S1, the base materials that are cold and in a solid state are irradiated with the laser beam and melted. Therefore, the thermal energy required to melt the base materials in this state is greater than that required to melt the base materials in a region around the melted portion in the state after the irradiation and scanning with the laser beam and melting of the base materials have been started (workpieces after the start of irradiation). Thus, in the region around the melted portion of the base materials in the state after the scanning and melting have been started, the base materials have already been heated and therefore the desired penetration depth can be obtained by a laser beam set to a relatively low output. In contrast, at the start position S1 where the base materials have not been heated by irradiation and melted, the desired penetration depth cannot be obtained unless the output of the laser beam is increased because the base materials have not yet been heated and melted. This is the reason why the laser beam has been set to a high output in the welding process according to the related art in which the base materials are irradiated and scanned with the laser beam set to a constant output.

CITATION LIST

Patent Literature

Patent Document 1 is Japanese Unexamined Patent Application Publication No. 2008-277272.

BRIEF SUMMARY OF THE INVENTION

Unfortunately, when the base materials are laser-welded together by irradiating and scanning the base materials with a laser beam set to a high output as described above, spatter (slag and metal particles spattered during welding) is easily generated in the welding process. The generated spatter easily adheres to the surfaces of the base materials. As described above, the base materials that are cold and in a solid state are irradiated with the laser beam at the irradiation (welding) start position; therefore, at the start position, the base materials are rapidly heated and increased in temperature, and rapid melting occurs. Furthermore, when the laser beam is set to a high output at the start of irradiation and scanning as described above, the base materials are more rapidly heated and increased in temperature at the welding start position (light-receiving portion). Accordingly, at the irradiation start position of the base materials, the increase in temperature due to heat conduction occurs more rapidly at and in the vicinity of the outer surfaces than in an inner region, and excessive melting tends to occur subsequently. As a result, bumping of the molten metal occurs in a region including the start position, and this leads to generation and scattering of spatter. The adhesion of the generated and scattered spatter itself is unacceptable, and there is also a problem that the generation and scattering of spatter leads to a loss in the molten metal. Therefore, when small members are to be precisely welded together, as in the manufacture of the above-described ground electrode, and when the bead width of the laser welding process is small, the welding strength (joining strength) will be affected.

Figure 7:
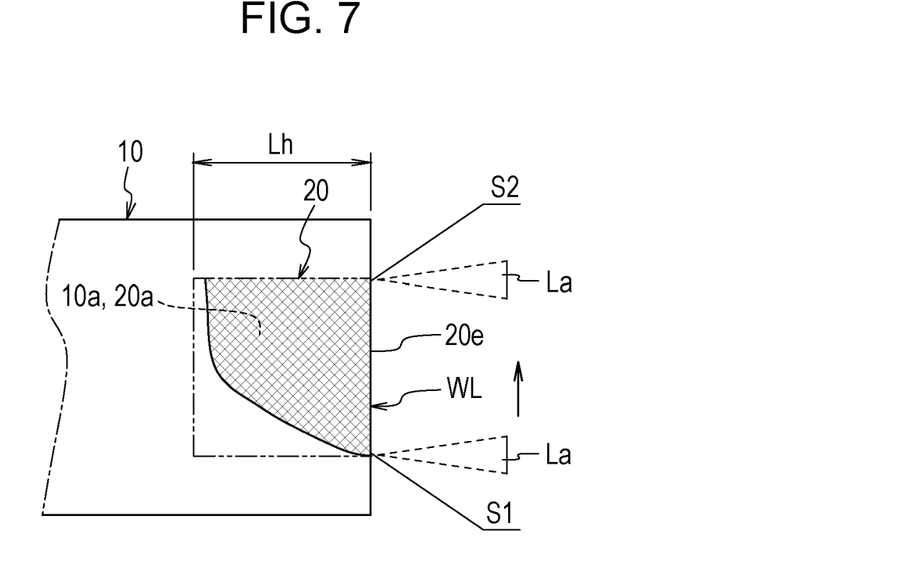
FIG. 7 is a schematic plan view illustrating the problems with a laser welding process for the structure illustrated in FIGS. 6A and 6C.

To prevent the generation of spatter, the laser beam may be set to a low output. Alternatively, the laser beam may be set to an output low enough to prevent the generation of spatter in an early stage or the first half of the scanning process, in which spatter is easily generated, and then to an output high enough to achieve a predetermined penetration depth later in the scanning process. However, in either case, the desired penetration depth cannot be obtained at least in the early stage of the scanning process, that is, at and in the vicinity of the irradiation start position. As a result, as shown by the double shaded area in FIG. 7, even when the penetration depth along the abutting surfaces 10*a* and 20*a* of the two members is sufficiently large at the irradiation (welding) end position S2, the penetration depth at a location near the start position S1 in the early stage or first half of the scanning process is smaller than that at the end position S2. Therefore, the abutting surfaces cannot be welded over a sufficiently large area. In addition to the reduction in the welding area, the above-described welding process also has a problem that the depth of the welded area in the direction of the side length Lh of the noble metal tip 20 (left-right direction in FIG. 7) greatly varies along the scanning direction (welding line WL). Therefore, the joining strength is not uniform. As described above, although the generation of spatter can be prevented by reducing the output in the early stage or first half of the welding process, the welding area will be insufficient and non-uniform. Thus, the abutting surfaces cannot be strongly and reliably welded together.

The present invention has been made to solve the problems of the above-described laser welding process, and an object of the present invention is to provide a laser welding method including the steps of stacking two members together; irradiating an edge of abutting surfaces of the two members with a laser beam; and scanning a welding line, which is a line extending along the edge, with the laser beam from a welding start position to a welding end position so that the abutting surfaces of the two members are welded together. The laser welding method prevents generation of spatter, ensures sufficient penetration depth at and in the vicinity of the welding start position, and enables the abutting surfaces to be welded together at the desired penetration depth from the edge toward a deeper location between the abutting surfaces along the scanning direction. It is also an object of the present invention to provide a welded-body manufacturing method including the above-described welding process and a method for manufacturing, for example, an electrode for a spark plug (ground electrode or center electrode).

A laser welding method according to a first aspect of the present invention includes stacking two members together and scanning a welding line extending along an edge of abutting surfaces of the two members with irradiation from a laser beam from a welding start position to a welding end position so that the abutting surfaces of the two members are welded together (i.e, irradiating an edge of abutting surfaces of the two members with a laser beam; and scanning a welding line, which is a line extending along the edge, with the laser beam from a welding start position to a welding end position so that the abutting surfaces of the two members are welded together). An output of the laser beam at which the irradiation with the laser beam is started at the welding start position of the welding line is set so that spatter is not generated. After the start of the irradiation, the output of the laser beam is gradually increased so that a penetration depth from the edge to a deeper location between the abutting surfaces falls within a predetermined penetration depth range while the laser beam is not moved. After the output of the laser beam is gradually increased, the laser beam is moved toward the welding end position so that the penetration depth is maintained within the predetermined penetration depth range.

A laser welding method according to a second aspect of the present invention includes stacking two members together and scanning a welding line extending along an edge of abutting surfaces of the two members with irradiation from a laser beam from a welding start position to a welding end position so that the abutting surfaces of the two members are welded together (i.e., irradiating an edge of abutting surfaces of the two members with a laser beam; and scanning a welding line, which is a line extending along the edge, with the laser beam from a welding start position to a welding end position so that the abutting surfaces of the two members are welded together). An output of the laser beam at which the irradiation with the laser beam is started at the welding start position of the welding line is set so that spatter is not generated. For a predetermined time period after the start of the irradiation, the output of the laser beam is gradually increased so that a penetration depth from the edge to a deeper location between the abutting surfaces falls within a predetermined penetration depth range while the laser beam is moved at a relatively low velocity that is lower than a velocity at which the laser beam is moved in a period other than the predetermined time period. After the output of the laser beam is gradually increased, the laser beam is moved toward the welding end position so that the penetration depth is maintained within the predetermined penetration depth range.

According to a third aspect of the present invention, in the laser welding method according to the first or second aspect, instead of moving the laser beam so that the penetration depth is maintained within the predetermined penetration depth range, the laser beam is moved while the output thereof is gradually reduced at least temporarily within a predetermined output range so that the penetration depth is maintained within the predetermined penetration depth range.

According to a fourth aspect of the present invention, in the laser welding method according to the first or second aspect, instead of moving the laser beam so that the penetration depth is maintained within the predetermined penetration depth range, the laser beam is moved while a velocity thereof is gradually increased at least temporarily within a predetermined velocity range so that the penetration depth is maintained within the predetermined penetration depth range.

According to a fifth aspect of the present invention, in the laser welding method according to the first or second aspect, instead of moving the laser beam so that the penetration depth is maintained within the predetermined penetration depth range, the laser beam is moved while the output thereof is gradually reduced at least temporarily within a predetermined output range and while a velocity thereof is gradually increased at least temporarily within a predetermined velocity range so that the penetration depth is maintained within the predetermined penetration depth range.

According to a sixth aspect of the present invention, in the laser welding method according to any one of the first to fifth aspects, one of the two members is an electrode body of a ground electrode or a center electrode for a spark plug, and the other of the two members is a noble metal tip welded to an end of the electrode body.

A method for manufacturing a welded body according to a seventh aspect of the present invention includes welding two members together by the laser welding method according to any one of the first to fifth aspects.

A method for manufacturing an electrode for a spark plug according to an eighth aspect of the present invention includes welding an electrode body and a noble metal tip together by the laser welding method according to the sixth aspect.

A method for manufacturing a spark plug includes manufacturing an electrode for the spark plug by the method according to the eight aspect.

With regard to the output of the laser beam, a rough boundary value between the output at which spatter is not generated and the output at which spatter is generated can be determined through tests performed on the members to be welded together (base materials). Welding tests may be performed by varying, for example, the output of the laser beam in accordance with the melting points, thermal conductivities, and heat capacities of the base materials. The output at which spatter is not generated may be appropriately set based on the results of the welding tests. The initial output at the welding start position may be set to 0 or to 50%, for example, of an average output at which generation of spatter started in the welding tests. Thus, the initial output may be set to an appropriate value in consideration of a certain margin of safety.

In the present invention, the "predetermined penetration depth range" may be set on the basis of, for example, the area in which the abutting surfaces are to be welded together in accordance with the materials and sizes of the two members to be welded together and the size of the abutting surfaces of the two members. When, for example, the abutting surfaces of the two members are rectangular, and when a long side of one of the members is the edge (welding line) to be irradiated, the direction of the penetration depth is the direction of the short sides if the abutting surfaces are to be welded together by melting and solidifying the abutting surfaces over the entire area thereof. In this case, the "predetermined penetration depth range" may be set with reference to the length of the short sides. When, for example, the length of the short sides is 1.5 mm, the range may be, for example, 1.4 to 1.6 mm, 1.3 to 1.4 mm, or 1.4 to 1.5 mm. Thus, the range may be set by adding an appropriate dimensional tolerance based on the welding precision. After the output of the laser beam is gradually increased, the laser beam may be moved toward the welding end position so that the penetration depth is maintained within the predetermined penetration depth range in consideration of the relationship between the output and scanning velocity.

The output of the laser beam may be gradually increased in any way as long as the output is increased over time. For example, the output may be increased in a linear manner in proportion to time, in a linear manner along multiple straight lines connected at one or more critical points, in a non-linear manner, in a stepwise manner, or in a combination of these manners. The output may be gradually increased in accordance with the conditions of, for example, the members to be welded together so that rapid heating and temperature increase that lead to generation of spatter do not occur in consideration of, for example, the difference between the output at the start of the irradiation and the output at which the predetermined penetration depth is obtained.

According to the first aspect of the present invention, the output of the laser beam is gradually increased until the penetration depth falls within the predetermined penetration depth range while the laser beam is not moved from the welding (irradiation) start position. After the output of the laser beam is gradually increased, the laser beam is moved toward the end position. Thus, generation of spatter can be prevented or suppressed, and the penetration depth can be maintained within the predetermined penetration depth range along the welding line in the welding process. As a result, the members can be welded together over the desired welding area without causing excessive melting, and therefore can be strongly and reliably welded together at high efficiency.

According to the first aspect, the output of the laser beam is gradually increased without moving the laser beam, that is, while the laser beam is stationary at the welding start position, until the penetration depth falls within the predetermined penetration depth range. However, as in the second aspect of the present invention, for the predetermined time period after the start of the irradiation, the output of the laser beam may be gradually increased so that the penetration depth from the edge to the deeper location between the abutting surfaces falls within the predetermined penetration depth range while the laser beam is moved at the relatively low velocity that is lower than the velocity at which the laser beam is moved in the period other than the predetermined time period. Here, the "relatively low velocity" is a velocity lower than a velocity at which the laser beam is moved toward the end position after the output of the laser beam has been gradually increased. In the second aspect of the present invention, the laser beam is moved before the penetration depth falls within the predetermined penetration depth range, although the velocity thereof is relatively low. Therefore, the penetration depth is not within the predetermined penetration depth range over a portion of the welding line along which the laser beam is moved. To minimize the length of the portion of the welding line in which the penetration depth is not within the predetermined penetration depth range, the "relatively low velocity" is preferably as low and close to 0 as possible. In addition, while the laser beam is being moved, the rate at which the output is gradually increased (rate of gradual increase) is preferably increased within such a range that spatter is not generated.

After the output of the laser beam is gradually increased so that the penetration depth falls within the predetermined penetration depth range, the laser beam is moved toward the welding end position so that the penetration depth is maintained within the predetermined penetration depth range.

While the laser beam is being moved, the output may be set to an output that is either the same as or different from the output at which the penetration depth fell within the predetermined penetration depth. When the output is set to a different output, as in the third aspect of the present invention, in the laser welding method according to the first or second aspect, instead of moving the laser beam so that the penetration depth is maintained within the predetermined penetration depth range, the laser beam may be moved while the output thereof is gradually reduced at least temporarily within a predetermined output range so that the penetration depth is maintained within the predetermined penetration depth range. In this case, excessive heating and excessive melting after the gradual increase in the output can be prevented, and variation in the penetration depth can be reduced. Here, the expression "the laser beam may be moved while the output thereof is gradually reduced at least temporarily" means that the gradual reduction may either be carried out over the entire scanning period or over a part of the scanning period after the gradual increase in the output. For example, the output may be gradually reduced only in the front half of the scanning period after the gradual increase thereof. The scanning velocity after the gradual increase in the output may either be constant or varied in consideration of the relationship with the output so that the penetration depth is maintained within the desired predetermined penetration depth range.

In the third aspect, after the gradually increasing the output, the output may be gradually reduced reversely to the above-described manner in which the output of the laser beam is gradually increased. More specifically, the output may be reduced in a linear manner in proportion to time, in a linear manner along multiple straight lines connected at one or more critical points, in a non-linear manner, in a stepwise manner, or in a combination of these manners. The manner in which the output is gradually reduced may be determined so that the penetration depth is maintained within the desired penetration depth range in accordance with, for example, the scanning velocity, the sizes of the base materials and the abutting surfaces, and the length of the welding line. As described above, the gradual reduction in the output may be started immediately after the penetration depth falls within the predetermined penetration depth, that is, immediately after the completion of the process of gradually increasing the output, or after a certain time after the completion of the process of gradually increasing the output.

In the third aspect, the output is gradually reduced after being gradually increased to prevent excessive heating and excessive melting and reduce variation in the penetration depth. However, as in the fourth aspect of the present invention, in the first or second aspect, instead of moving the laser beam so that the penetration depth is maintained within the predetermined penetration depth range, the laser beam is moved while a velocity thereof is gradually increased at least temporarily within a predetermined velocity range so that the penetration depth is maintained within the predetermined penetration depth range. When the scanning velocity is gradually increased in this way, a similar effect can be obtained because the irradiation time can be reduced. Also in this case, the scanning velocity may be gradually increased in any appropriate manner as in the above-described case where the output is gradually increased.

As is clear from the third and fourth aspects, these aspects may be applied in combination, as in the fifth aspect of the present invention. In this case, the output may be gradually reduced and the velocity may be gradually increased so that the penetration depth is maintained within the desired predetermined penetration depth range and is uniform along the welding line.

In the laser welding method according to the sixth aspect of the present invention, one of the two members is an electrode body of a ground electrode or a center electrode for a spark plug, and the other of the two members is a noble metal tip welded to an end of the electrode body. As in this case, the present invention is particularly suitable for when two members are required to be precisely and strongly welded together, as in an electrode for a spark plug in which the welded body is constantly subjected to severe conditions. However, the members to be welded together according to the present invention are not limited to this. The present invention may also be applied to a welded body for a spark plug other than an electrode, or a welded body (body obtained by welding two members together) for a component other than a spark plug. According to a method for manufacturing a welded body including the step of welding two members together by the laser welding method according to any one of the first to fifth aspects, as in the seventh aspect of the present invention, a high-precision, high-weld-strength welded body can be manufactured.

The welded body may be a structural part or member of various types of components including sensors, such as a gas sensor, and vehicle components (components mounted in an automobile), such as a glow plug. According to the method for manufacturing an electrode for a spark plug of the eighth aspect of the present invention, a high-precision, high-weld-strength electrode (ground electrode or center electrode) can be manufactured as described above. Therefore, according to a method for manufacturing a spark plug including the step of manufacturing an electrode for the spark plug by the method according to the eighth aspect, as in the ninth aspect of the present invention, a high-quality spark plug having high discharge ignitability and durability can be manufactured.

BRIEF DESCRIPTION OF THE DRAWINGS

Illustrative aspects of the invention will be described in detail with reference to the following figures wherein:

FIGS. 6A to 6C are partial enlarged schematic views illustrating the manner in which the noble metal tip (rectangular parallelepiped) is positioned and stacked on the ground electrode body (strip plate member or rectangular bar member) of the spark plug and in which abutting surfaces of the two members are laser-welded together, where

DETAILED DESCRIPTION OF EXEMPLARY EMBODIMENTS OF THE INVENTION

A laser welding method and a method for manufacturing a welded body according to an embodiment of the present invention will be described in detail with reference to the drawings. In the present embodiment, a ground electrode is manufactured as the welded body. More specifically, the noble metal tip (rectangular parallelepiped) 20 is positioned and stacked on the ground electrode body 10 of the spark plug, as illustrated in FIGS. 6A to 6C, and the abutting surfaces 10a and 20a of the ground electrode body 10 and the noble metal tip 20 are laser-welded together along the welding line WL. The welding line WL is a side (straight line) at an edge (tip edge) 20e adjacent to the front end surface 11 of the ground electrode body 10 (right side in FIGS. 6A and 6B) among the edges of the abutting surfaces 10a and 20a. The welding line WL is scanned with the laser beam La from the irradiation (welding) start position S1 at the bottom end of the welding line WL in FIG. 6B (plan view) to the welding end position S2 at the other end, that is, the top end in FIG. 6B. The materials, sizes, etc., of the members are as described above. In this example, the penetration depth range is set in accordance with the side length Lh (for example, 1.5 mm) of the noble metal tip (rectangular parallelepiped) 20 in the plan view of FIG. 6B, and is set to Lh±α (for example, 1.4 to 1.6 mm) along the direction of the welding line WL.

In this example, the welding line WL is irradiated with the laser beam La by using a laser welding machine (not shown). When the irradiation is started at the welding (irradiation with the laser beam La) start position S1 of the welding line WL illustrated in FIG. 6B, the laser beam La is set to a low (weak) output at which spatter is not generated. Then, the output of the laser beam La is gradually increased at the irradiation start position S1 without moving the laser beam La. The output is gradually increased until the penetration depth from the edge 20e toward a deeper location along the abutting surfaces 10a and 20a falls within the predetermined penetration depth range (Lh±α). After the penetration depth has fallen within the predetermined penetration depth range, the laser beam La set to the increased output is moved toward the end position S2 at, for example, an appropriate constant velocity. The velocity is set so that the penetration depth is maintained within the predetermined penetration depth range.

Figure 1A:
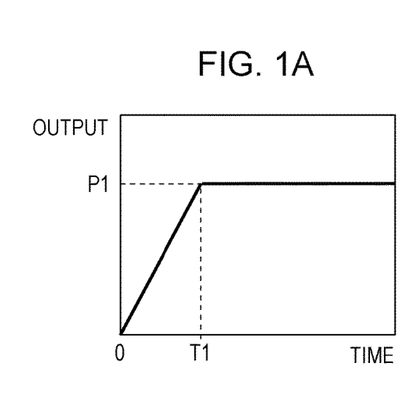
FIG. 1A is a graph showing the relationship between time and output of a laser beam when a noble metal tip (rectangular parallelepiped) is positioned and stacked on a ground electrode body (strip plate member or rectangular bar member) of a spark plug and when abutting surfaces of the two members are laser-welded together (see FIGS. 6A to 6C), where the horizontal axis represents time and the vertical axis represents output.
Figure 1B:
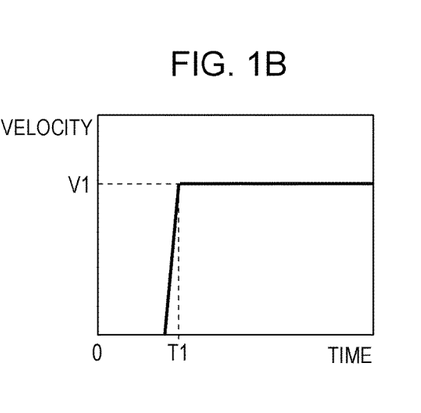
FIG. 1B is a graph showing the relationship between time and scanning velocity of the laser beam when the output varies as in FIG. 1A, where the horizontal axis represents time and the vertical axis represents scanning velocity.

FIG. 1A shows an example of the relationship between the gradually increased output of the laser beam La and time in the above-described welding process. The output P is set to 0 at the irradiation start time, and is proportionally increased to P1, at which the desired predetermined penetration depth can be obtained, in time T1 so that spatter is not generated. After the output has been increased, the laser beam La is moved from the start position S1 to the end position S2 at an appropriate constant velocity V1 while the output is maintained at P1. Thus, in this example, as illustrated in FIG. 1B, the laser beam La is stopped at the welding start position S1 until time T1, at which the output reaches P1. After time T1, at which the output reaches P1, the laser beam (irradiation spot) La set to the output P1 is moved toward the end position S2 at the constant velocity V1. In this example, the output P1, to which the output of the laser beam La is gradually increased, is in the range of, for example, 250 to 500 W, and the scanning velocity V1 is in the range of, for example, 50 to 200 mm/sec.

Figure 2:
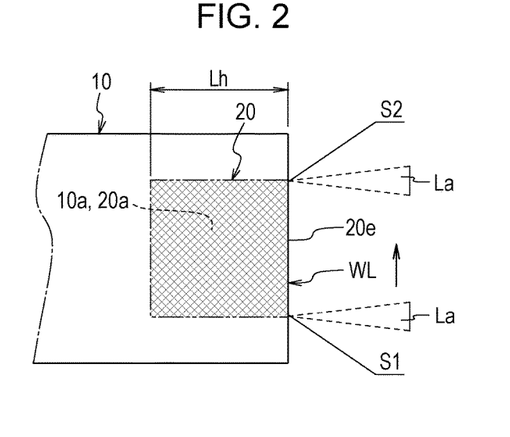
FIG. 2 is a schematic diagram illustrating a penetration depth (double shaded area) along the abutting surfaces that are laser-welded together under the conditions in FIGS. 1A and 1B.

According to the above-described example of the laser welding method, spatter is not generated. Moreover, as shown by the double shaded area in FIG. 2, the abutting surfaces 10a and 20a of the ground electrode body 10 and the noble metal tip 20 are welded together while the penetration depth is maintained within the predetermined penetration depth range (Lh±α) along the welding line WL. In the above-described example of the welding method, unlike the method according to the related art in which the laser beam La is set to a high output when the irradiation is started at the irradiation start position S1 and is moved while the output thereof is maintained, the output of the laser beam is set so that spatter is not generated when the irradiation is started, and is then gradually increased. Therefore, generation of spatter does not occur. In addition, since the laser beam is not set to a low output when the laser beam is moved to the end position S2, failure in achieving the desired penetration depth at and in the vicinity of the irradiation start position S1 can be prevented. Thus, according to the above-described welding method, the penetration depth is sufficient and uniform from the scanning start position S1 to the end position S2, and the two members can be welded together over the entire area of the abutting surfaces 10a and 20a. As a result, the noble metal tip is strongly and reliably welded to the ground electrode, and therefore a spark plug having high ignitability and durability can be provided.

The ground electrode (component) obtained by the above-described electrode manufacturing method that embodies the above-described example of the laser welding method is used to manufacture a spark plug. Thus, the spark plug 100 according to the related art illustrated in FIG. 8 is obtained. The spark plug 100 is manufactured by a commonly known manufacturing process. An example of the manufacturing process will be briefly described with reference to FIG. 8. As indicated by the two-dot chain lines in FIG. 8, the ground electrode (component) is resistance-welded to the front end surface 43 of the above-described metal shell (work in process) 40 so that an end surface (back end surface) at the end opposite to the end where the noble metal tip 20 is disposed perpendicularly faces the front end surface 43. Then, finishing processes, for example, a process of forming a thread 46 on the outer peripheral surface of the metal shell 40, are performed. The finished metal shell including the ground electrode is transferred to the subsequent assembly process. In the assembly process, the center electrode 60 including a terminal 65, the insulator 50, etc., are disposed in the metal shell 40, and a back end 47 of the metal shell 40 is bent inward and compressed (crimped) toward the front (upward in FIG. 8). Then, the ground electrode body 10 of the ground electrode 31 is bent inward so that a predetermined discharge spark gap is formed. The spark plug 100 illustrated in FIG. 8 is obtained by the above-described processes.

In this example, the present invention is embodied in a welding method and a manufacturing method for the ground electrode 31. However, the present invention may also be similarly embodied in a method for manufacturing the center electrode 60 including a noble metal tip welded to the tip end thereof. A spark plug including at least a ground electrode or a center electrode in which the present invention is embodied has higher ignitability and durability than a spark plug that does not include such an electrode. When a noble metal tip is welded to the tip end of the center electrode (when the center electrode including the noble metal tip is manufactured), the abutting surfaces may be circular because the noble metal tip is typically columnar or disc-shaped. In such a case, the welding line is circular unlike that in the above-described example. However, the present invention may be embodied similarly to the above-described example in other respects. This will be described in detail below.

Figure 3A:
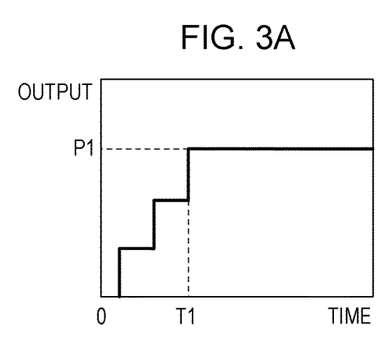
FIGS. 3A to 3D illustrate other examples of the manner in which the output of the laser beam is gradually increased (four patterns of variations in the output of the laser beam with respect to time)
Figure 3B:
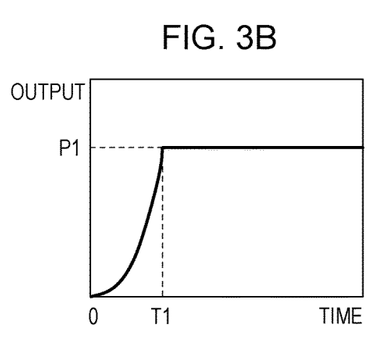
Figure 3C:
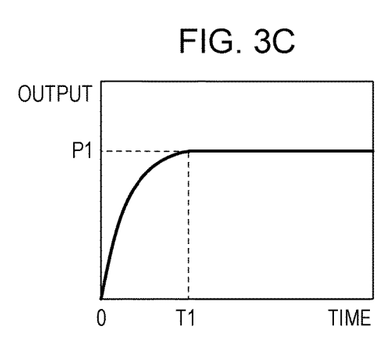
Figure 3D:
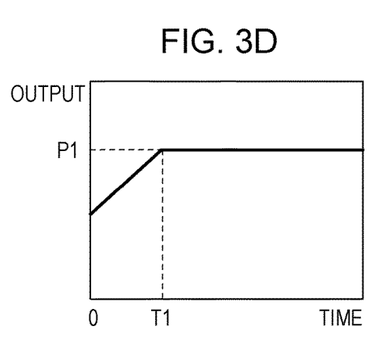
Figure 4A:
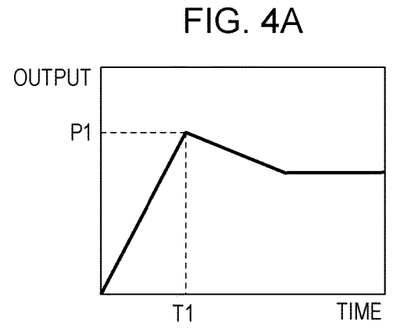
FIGS. 4A to 4D illustrate examples (four patterns) of the manner in which the output of the laser beam is gradually reduced after being gradually increased until the penetration depth falls within a predetermined penetration depth range (manner in which the output of the laser beam is varied with respect to time)
Figure 4B:
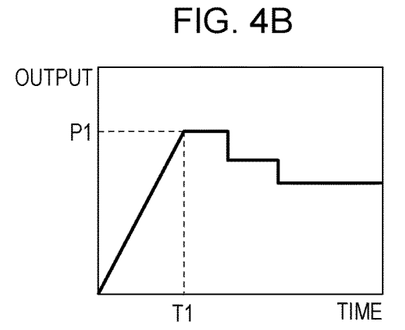
Figure 4C:
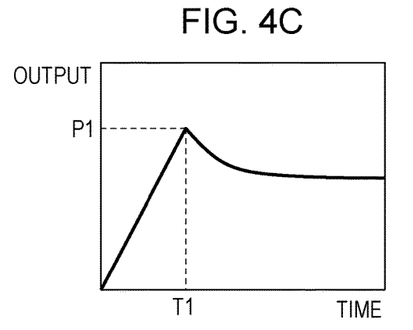
Figure 4D:
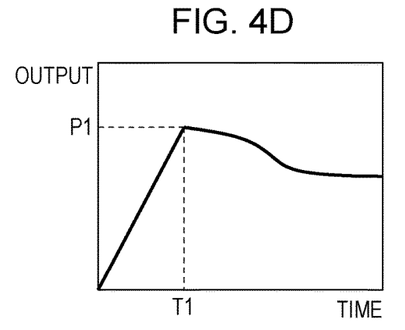

In the above-described example (example of the laser welding method), the output of the laser beam La is gradually and proportionally increased from 0 at the irradiation start time until the penetration depth falls within the predetermined penetration depth range (Lh±α). However, the output may instead be increased in a stepwise manner as illustrated in FIG. 3A, in a non-linear manner (along a downwardly convex curve) as illustrated in FIG. 3B, or along an upwardly convex curve as illustrated in FIG. 3C. Also, when the irradiation is started, the output may be gradually increased not from 0 but from an appropriate low output within a range in which spatter is not generated, as illustrated in FIG. 3D. As described above, the output of the laser beam La may be gradually increased in any appropriate manner until the penetration depth falls within the predetermined penetration depth range (Lh±α).

In the above-described example, the irradiation is started and the output of the laser beam La is gradually increased without moving the laser beam La from the welding start position S1. However, even when the movement of the laser beam La is started at the start of the irradiation, the velocity of the laser beam La may be very low and close to 0 so that the penetration depth falls within the predetermined penetration depth range (Lh±α) at a location near the start position S1. In such a case, the laser beam La may be moved while the output thereof is being gradually increased for a predetermined time after the start of the irradiation until the penetration depth falls within the predetermined penetration depth range (Lh±α). However, in this case, since the laser beam La is moved before a predetermined penetration depth is obtained, although the distance by which the laser beam La is moved is small, a region in which the penetration depth is small is formed around the start position S1. Therefore, as described above, the velocity is set as low as possible in this case.

In the above-described example, after the output has been gradually increased and the penetration depth has fallen within the predetermined penetration depth range (Lh±α), the laser beam La is moved toward the end position S2 at the constant velocity V1 while the output thereof is maintained constant. However, as described above, even when the output of the laser beam La is reduced after being gradually increased, the penetration depth may fall within the predetermined penetration depth range (Lh±α) due to heat that has been applied. Therefore, in such a case, the output may be gradually reduced from P1 as illustrated in FIGS. 4A, 4B, 4C, and 4D in, for example, the first half of the scanning period after the penetration depth has fallen within the predetermined penetration depth range (Lh±α), and then maintained constant until the laser beam La reaches the end position. The manner in which the output is reduced may be set and controlled so that the penetration depth falls within the predetermined penetration depth range (Lh±α) in consideration of the relationship with the scanning velocity.

Figure 5A:
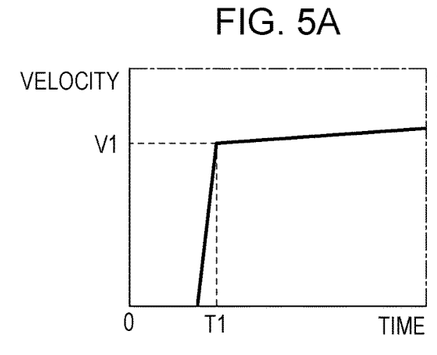
FIGS. 5A and 5B illustrate examples (two patterns) of the manner in which the scanning velocity of the laser beam is gradually increased after the output of the laser beam is gradually increased until the penetration depth falls within the predetermined penetration depth range (manner in which the scanning velocity is varied with respect to time)
Figure 5B:
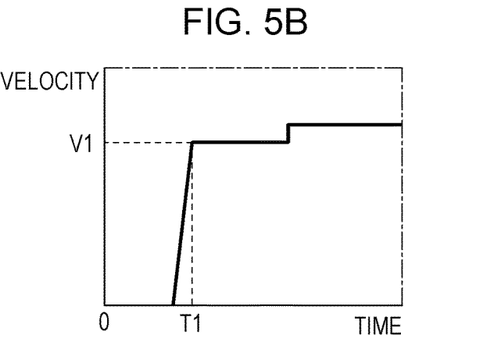

In the above-described example, the laser beam La is moved at a constant velocity after the output thereof has been gradually increased. However, after the output has been increased (after time T1) and after the penetration depth has fallen within the predetermined penetration depth range (Lh±α), even when the scanning velocity of the laser beam La is gradually increased (even when the irradiation time is reduced), the penetration depth may be maintained within the predetermined penetration depth range (Lh±α) due to heat that has been applied. In such a case, the velocity may be gradually increased, as illustrated in FIGS. 5A and 5B, instead of being maintained constant. More specifically, after time T1, the velocity may be increased proportionally as illustrated in FIG. 5A, or stepwise as illustrated in FIG. 5B. In either case, the velocity may be appropriately set in consideration of the relationship with the output so that the penetration depth falls within the desired predetermined penetration depth range (Lh±α) along the welding line WL. As is clear from the above description, the gradual reduction in the output and the gradual increase in the scanning velocity may be applied in combination as long as the penetration depth falls within the desired predetermined penetration depth range (Lh±α) along the welding line WL after the output has been gradually increased (after time T1).

In the above-described example, the laser welding method according to the present invention is used to weld a noble metal tip to a ground electrode body to manufacture a ground electrode of a spark plug. However, the laser welding method (method for manufacturing a welded body) according to the present invention is not limited to this, and may also be applied to various other processes in which two members are stacked and welded together as described above. More specifically, as described above, the welding method may be applied irrespective of the use, type, etc., of the welded body (body obtained by welding two members together). The manufactured welded body may be a structural part or member of various types of components including sensors, such as a gas sensor, and vehicle components (components mounted in an automobile), such as a glow plug, in addition to the ground electrode and center electrode of the spark plug. The laser welding method is not limited to the cases where members made of different metals or the same metal are welded together, and may be applied to various cases in which members are laser welded together to manufacture a welded body. Furthermore, the laser welding method according to the present invention may be applied to various cases in which the penetration depth is set within the desired predetermined penetration depth range even when the welding area (penetration depth) is set so as not to weld the abutting surfaces together over the entire area thereof.

Although the present invention is applied to a method for manufacturing a ground electrode of a spark plug in the above-described example, the present invention may also be similarly applied to a method for manufacturing a center electrode of a spark plug, as described above. More specifically, the present invention may also be applied to a case in which a noble metal tip is welded to the tip end (end at which a discharge spark gap is formed) of a center electrode body of the center electrode. As described above, in this case, the abutting surfaces are circular because the noble metal tip is typically columnar or disc-shaped, and accordingly the welding line WL is circular. In this case, the edge (circumference) of the abutting surfaces is irradiated with the laser beam while the members to be welded together are rotated, for example, one turn around the center of the circular abutting surfaces, so that the edge (circumference) can be scanned with the laser beam. Thus, the welding process is performed so that the penetration depth in the radial direction falls within a predetermined penetration depth range along the circumference. In the present invention, the welding line is not limited to a straight line. The laser welding method may be applied to various known laser welding techniques, such as YAG laser welding and $CO_2$ laser welding.

What is claimed is:

1. A laser welding method comprising:
   stacking two members together; and
   scanning a welding line extending along an edge of abutting surfaces of the two members with irradiation from a laser beam from a welding start position to a welding end position so that the abutting surfaces of the two members are welded together, wherein scanning the welding line includes:
   setting an output of the laser beam at which the irradiation with the laser beam is started at the welding start position of the welding line so that spatter is not generated,
   gradually increasing the output of the laser beam so that a penetration depth from the edge to a deeper location between the abutting surfaces falls within a predetermined penetration depth range while the laser beam is not moved, and
   after the output of the laser beam is gradually increased, moving the laser beam toward the welding end position so that the penetration depth is maintained within the predetermined penetration depth range.

2. The laser welding method according to claim 1, wherein moving the laser beam so that the penetration depth is maintained within the predetermined penetration depth range includes moving the laser beam while the output thereof is gradually reduced at least temporarily within a predetermined output range so that the penetration depth is maintained within the predetermined penetration depth range.

3. The laser welding method according to claim 1, wherein moving the laser beam so that the penetration depth is maintained within the predetermined penetration depth range includes moving the laser beam while a velocity thereof is gradually increased at least temporarily within a predetermined velocity range so that the penetration depth is maintained within the predetermined penetration depth range.

4. The laser welding method according to claim 1, wherein moving the laser beam so that the penetration depth is maintained within the predetermined penetration depth range includes moving the laser beam while the output thereof is gradually reduced at least temporarily within a predetermined output range and while a velocity thereof is gradually increased at least temporarily within a predetermined velocity range so that the penetration depth is maintained within the predetermined penetration depth range.

5. The laser welding method according to claim 1, wherein one of the two members is an electrode body of a ground electrode or a center electrode for a spark plug, and the other of the two members is a noble metal tip welded to an end of the electrode body.

6. A method for manufacturing an electrode for a spark plug, comprising:
welding an electrode body and a noble metal tip together by the laser welding method according to claim 5.

7. A method for manufacturing a spark plug comprising:
manufacturing an electrode for the spark plug by the method according to claim 6.

8. A method for manufacturing a welded body, comprising:
welding two members together by the laser welding method according to claim 1.

9. A laser welding method comprising:
stacking two members together; and
scanning a welding line extending along an edge of abutting surfaces of the two members with irradiation from a laser beam from a welding start position to a welding end position so that the abutting surfaces of the two members are welded together, wherein scanning the welding line includes:
setting an output of the laser beam at which the irradiation with the laser beam is started at the welding start position of the welding line so that spatter is not generated,
for a predetermined time period after the start of the irradiation, gradually increasing the output of the laser beam so that a penetration depth from the edge to a deeper location between the abutting surfaces falls within a predetermined penetration depth range while the laser beam is moved at a relatively low velocity that is lower than a velocity at which the laser beam is moved in a period other than the predetermined time period, and
after the output of the laser beam is gradually increased, moving the laser beam toward the welding end position so that the penetration depth is maintained within the predetermined penetration depth range.

10. The laser welding method according to claim 9, wherein moving the laser beam so that the penetration depth is maintained within the predetermined penetration depth range includes moving the laser beam while the output thereof is gradually reduced at least temporarily within a predetermined output range so that the penetration depth is maintained within the predetermined penetration depth range.

11. The laser welding method according to claim 9, wherein moving the laser beam so that the penetration depth is maintained within the predetermined penetration depth range includes moving the laser beam while a velocity thereof is gradually increased at least temporarily within a predetermined velocity range so that the penetration depth is maintained within the predetermined penetration depth range.

12. The laser welding method according to claim 9, wherein moving the laser beam so that the penetration depth is maintained within the predetermined penetration depth range includes moving the laser beam while the output thereof is gradually reduced at least temporarily within a predetermined output range and while a velocity thereof is gradually increased at least temporarily within a predetermined velocity range so that the penetration depth is maintained within the predetermined penetration depth range.

13. The laser welding method according to claim 9, wherein one of the two members is an electrode body of a ground electrode or a center electrode for a spark plug, and the other of the two members is a noble metal tip welded to an end of the electrode body.

14. A method for manufacturing an electrode for a spark plug, comprising:
welding an electrode body and a noble metal tip together by the laser welding method according to claim 13.

15. A method for manufacturing a spark plug comprising:
manufacturing an electrode for the spark plug by the method according to claim 14.

16. A method for manufacturing a welded body, comprising:
welding two members together by the laser welding method according to claim 9.

* * * * *